United States Patent
Kim et al.

(10) Patent No.: US 10,117,272 B2
(45) Date of Patent: Oct. 30, 2018

(54) DATA TRANSMISSION METHOD AND DEVICE IN WIRELESS LAN SYSTEM SUPPORTING DOWNLINK ORIENTED CHANNEL

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 15/125,083

(22) PCT Filed: Mar. 5, 2015

(86) PCT No.: PCT/KR2015/002126
§ 371 (c)(1),
(2) Date: Sep. 9, 2016

(87) PCT Pub. No.: WO2015/137662
PCT Pub. Date: Sep. 17, 2015

(65) Prior Publication Data
US 2017/0019927 A1    Jan. 19, 2017

Related U.S. Application Data

(60) Provisional application No. 61/951,546, filed on Mar. 12, 2014.

(51) Int. Cl.
*H04W 4/00* (2018.01)
*H04L 12/26* (2006.01)
(Continued)

(52) U.S. Cl.
CPC ....... *H04W 74/0825* (2013.01); *H04L 5/0055* (2013.01); *H04W 72/04* (2013.01);
(Continued)

(58) Field of Classification Search
CPC ............. H04W 74/0825; H04W 72/04; H04W 72/1273; H04W 16/28; H04W 88/08; H04W 84/12; H04L 5/0055
See application file for complete search history.

(56) References Cited

U.S. PATENT DOCUMENTS

| 8,559,323 B2 | 10/2013 | Hart |
| 2011/0222486 A1* | 9/2011 | Hart ........................ H04L 5/001 370/329 |

(Continued)

FOREIGN PATENT DOCUMENTS

| WO | 2011025145 | 3/2011 |
| WO | 2013077600 | 5/2013 |

OTHER PUBLICATIONS

PCT International Application No. PCT/KR2015/002126, Written Opinion of the International Searching Authority dated May 29, 2015, 14 pages.

*Primary Examiner* — Kiet Tang
(74) *Attorney, Agent, or Firm* — Lee, Hong, Degerman, Kang & Waimey

(57) ABSTRACT

The present disclosure relates to a wireless communication system, and in particular to a data transmission operation of an AP in a wireless LAN system. To this end, the AP may obtain information on a STA located at an overlapping basic service set (OBSS) from among STAs connected to the AP, and determines, based thereon, (1) whether to transmit data from the AP through a downlink oriented channel or a general channel different from the downlink oriented channel, or (2) whether to use one or more of a distributed (Continued)

coordination function (DCF) procedure and an enhanced distributed channel access (EDCA) procedure.

20 Claims, 12 Drawing Sheets

(51) Int. Cl.
*H04W 74/08* (2009.01)
*H04L 5/00* (2006.01)
*H04W 72/04* (2009.01)
*H04W 84/12* (2009.01)
*H04W 16/28* (2009.01)
*H04W 88/08* (2009.01)
*H04W 72/12* (2009.01)

(52) U.S. Cl.
CPC ........ *H04W 16/28* (2013.01); *H04W 72/1273* (2013.01); *H04W 84/12* (2013.01); *H04W 88/08* (2013.01)

(56) References Cited

U.S. PATENT DOCUMENTS

| | | | |
|---|---|---|---|
| 2013/0201974 A1 | 8/2013 | Merlin et al. | |
| 2013/0329658 A1 | 12/2013 | Liu | |
| 2014/0112175 A1* | 4/2014 | Pantelidou | H04W 28/26 370/252 |
| 2014/0153415 A1* | 6/2014 | Choudhury | H04W 72/0446 370/252 |

\* cited by examiner

DATA TRANSMISSION METHOD AND DEVICE IN WIRELESS LAN SYSTEM SUPPORTING DOWNLINK ORIENTED CHANNEL

CROSS-REFERENCE TO RELATED APPLICATIONS

This application is the National Stage filing under 35 U.S.C. 371 of International Application No. PCT/KR2015/002126, filed on Mar. 5, 2015, which claims the benefit of U.S. Provisional Application No. 61/951,546, filed on Mar. 12, 2014, the contents of which are all hereby incorporated by reference herein in their entirety.

TECHNICAL FIELD

The present invention relates to a wireless communication system, and more particularly, to a method for an AP to transmit data in a high-dense WLAN system supporting a downlink oriented channel, method for an STA to receive the corresponding data, and apparatuses therefor.

BACKGROUND ART

While downlink channels as proposed hereinbelow may be used in various kinds of wireless communications, a WLAN system will be taken as an exemplary system to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM.

IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

In IEEE 802.11, communication is conducted on a shared wireless medium. Therefore, the communication environment of IEEE 802.11 is fundamentally different from a wired channel environment. For example, communication can be conducted based on Carrier Sense Multiple Access/Collision Detection (CSMA/CD) in the wired channel environment. In other words, once a transmitter transmits a signal, the signal arrives at a receiver without much signal attenuation because there is no great change in the channel environment. If two or more signals collide with each other, they can be detected because power sensed at the receiver instantaneously gets larger than power transmitted by the transmitter.

However, since a channel is affected by various factors (e.g., signal attenuation may increase with a distance or the signal may suffer from instantaneous deep fading) in the wireless channel environment, the transmitter cannot determine by carrier sensing whether the receiver has received a signal successfully or signal collision has occurred.

DISCLOSURE OF THE INVENTION

Technical Task

In the above-described wireless communication system, there is a need for transmitting and receiving a signal by efficiently controlling interference between Stations (STAs). However, since data transmission from an Access Point (AP) may be delayed due to indirect control between STAs in a high density Wireless Local Area Network (WLAN) system, a technique for efficiently performing data transmission from an AP to a STA is required.

Technical Solutions

In a first technical aspect of the present invention, provided herein is a method of transmitting data by an AP (access point) in a WLAN system, including: obtaining information on an STA located in an OBSS (overlapping basic service set) among STAs associated with the AP; determining, depending on whether an STA associated with the AP is located in the OBSS, (1) whether to transmit the data of the AP through a downlink oriented channel or a normal channel different from the downlink oriented channel or (2) whether to use either or both of a DCF (distributed coordination function) procedure and an EDCA (enhanced distributed channel access) procedure; and transmitting the data of the AP according to the determination.

The AP may obtain the information on the STA located in the OBSS by receiving a beacon or a probe response transmitted by a neighboring AP. Alternatively, the AP may obtain the information on the STA located in the OBSS by receiving OBSS information from the STA associated with the AP.

When there is no STA located in the OBSS and when the downlink oriented channel is idle during a PIFS (point coordination function interframe space) duration or a DIFS (distributed coordination function interframe space) duration, the AP may transmit the data through the downlink oriented channel without the DCF procedure and the EDCA procedure.

When the AP fails to receive ACK in response to the data transmitted by the AP during a predetermined time, the AP may retransmit the data without applying a backoff time after determining whether the downlink oriented channel is idle during the PIFS duration or the DIFS duration. In this case, a data retransmission waiting time of the AP may be increased in a stepwise manner according to the number of times of the retransmission.

Meanwhile, when the AP attempts to retransmit the data to a specific STA through the downlink oriented channel predetermined times or more, the AP may transmit the data to the specific STA through the normal channel.

The AP may transmit the data to the STA located in the OBSS among the STAs associated with the AP through the normal channel and wherein the AP transmits the data to an STA located out of the OBSS among the STAs associated with the AP through the downlink oriented channel.

When the number of STAs located in the OBSS among the STAs associated with the AP is equal to or greater than a predetermined threshold, the AP may transmit the data using either or both of the DCF procedure and the EDCA procedure.

Meanwhile, the AP may configure a NAV (network allocation vector) in case of receiving a CTS (clear to send) frame from a first STA. In addition, the AP may transmit the data to a second STA among the STAs associated with the AP by controlling a transmit power through power control so as not to affect data reception at the first STA.

The AP may transmit the data to the second STA such that the AP completes the data transmission after a time at which the first STA completes the data reception and then transmits ACK. Alternatively, the AP may transmit the data to the second STA such that the AP completes the data transmission and then receives ACK before the first STA1 completes the data reception.

The AP may transmit the data after exchanging an RTS (ready to send) frame and the CTS frame with the second STA.

In addition, the AP may select one of STAs located out of the OBSS as the second STA.

Moreover, the AP may control an effect on the data reception at the first STA by performing beamforming on the second STA when transmitting the data.

Further, an STA may receive the data according to the AP's data transmission described above and transmit data necessary for the AP to minimize a delay.

Advantageous Effects

As described above, according to the present invention, data, system performance can be improved by reducing a data transmission delay of an AP in a high-dense WLAN environment where a plurality of STAs are associated with the single AP. In addition, a data transmission delay of an STA can also be minimized.

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

Figure 1:
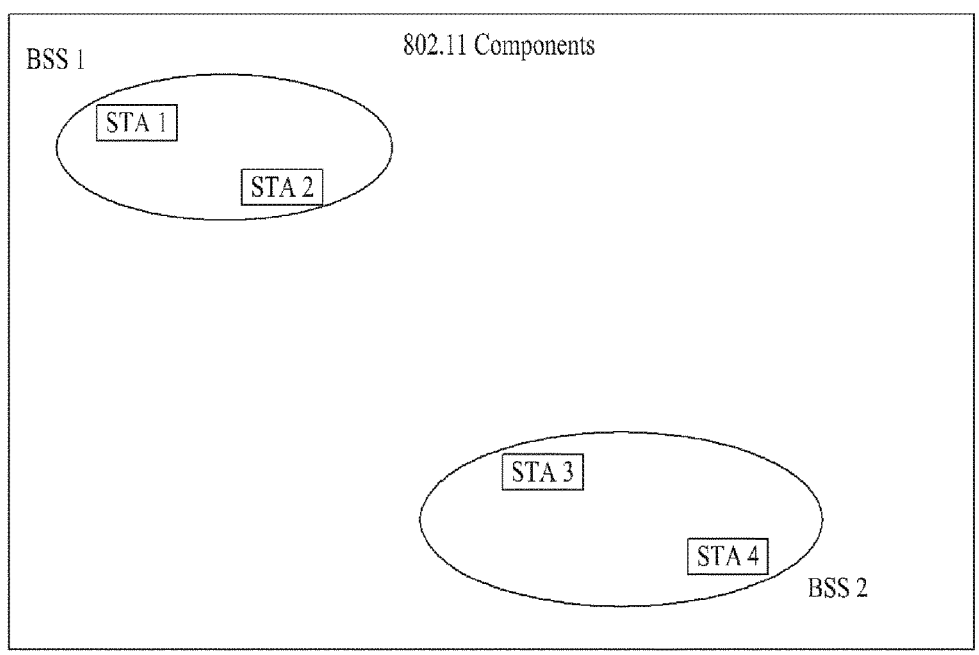
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
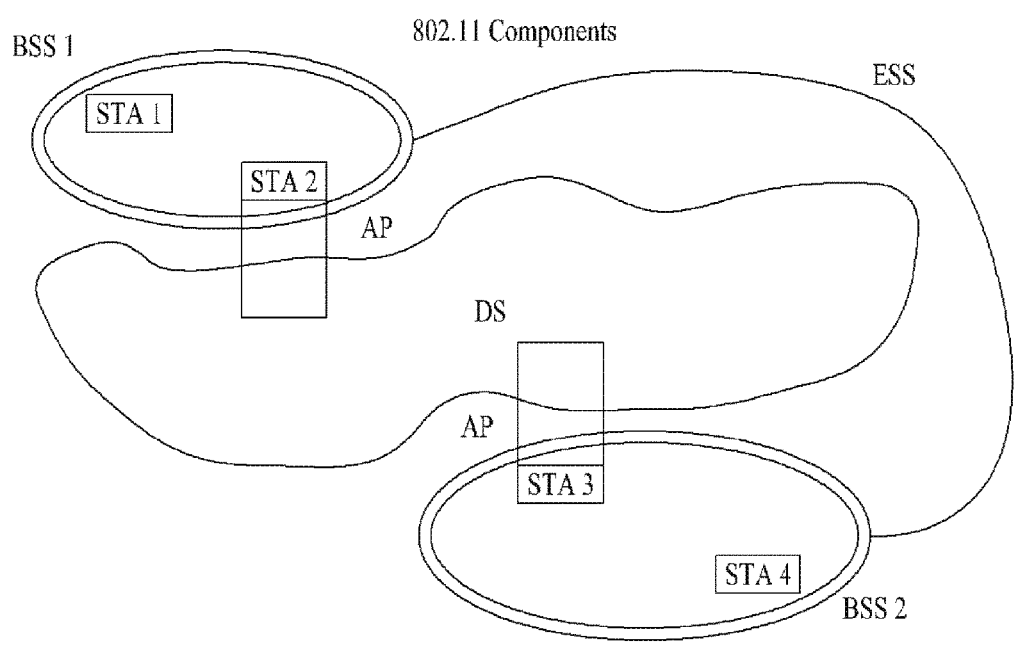
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Now, a collision detection scheme in a WLAN system will be described based on the above description.

Because various factors affect a channel in a wireless environment as described before, a transmitter is not capable of detecting a collision accurately. Accordingly, IEEE 802.11 has introduced a Distributed Coordination Function (DCF) being a Carrier Sense Multiple Access/Collision Avoidance (CSMA/CA) mechanism.

Figure 3:
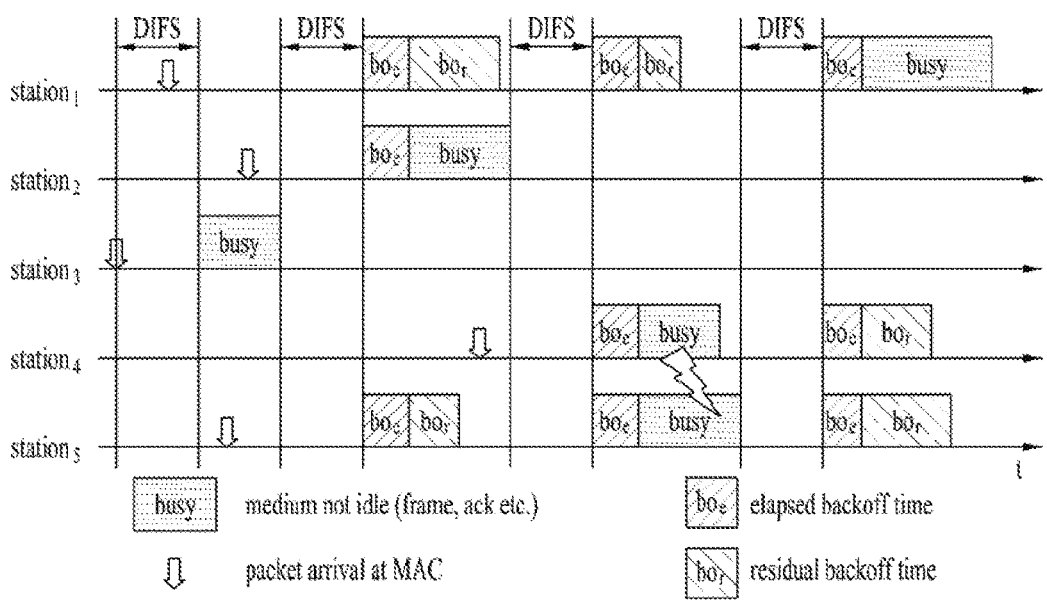
FIG. 3 is a diagram illustrating a Distributed Coordinated Function (DCF) mechanism in a WLAN system.

FIG. 3 illustrates a DCF mechanism in a WLAN system.

According to the DCF mechanism, STAs having transmission data perform Clear Channel Assessment (CCA) by sensing a medium during a specific duration (e.g., DCF Inter-Frame Space (DIFS)) before they transmit the data. If the medium is idle, an STA may transmit its data on the medium. On the contrary, if the medium is busy, the STA may transmit its data after further waiting a random backoff period, on the assumption that a plurality of STAs are waiting to use the medium. The random backoff period enables collision avoidance because each STA has a different backoff interval in probability and thus a different transmission time on the assumption that a plurality of STAs are to transmit data. Once one STA starts transmission, the other STAs may not use the medium.

A random backoff time and a random backoff procedure will be described in brief.

If a specific medium transitions from a busy state to an idle state, a plurality of STAs start to prepare for data transmission. To minimize collision, each STA selects a random backoff count and waits for as long a slot time period as the selected backoff count. The random backoff count is a pseudo-random integer and selected from a range of uniformly distributed values, 0 to CW. CW represents 'contention window'.

Although the CW parameter is initially set to CWmin, it is doubled upon transmission failure. For example, in the case where an ACK for a transmitted frame is not received, it may be determined that collision has occurred. If the CW value reaches CWmax, the STA maintains CWmax until the data transmission is successful. If the data transmission is successful, the CW value is reset to CWmin. Preferably, CW, CWmin, and CWmax are maintained to be $2^n-1$, for the convenience of configuration and operation.

When the random backoff procedure starts, the STA selects a random backoff count from the range of the values 0 to CW and continuously monitors the medium while counting down backoff slots according to the random backoff count. If the medium gets busy, the STA discontinues the count-down. When the medium becomes idle, the STA resumes the count-down of the remaining backoff slots.

Referring to FIG. 3, in the case where a plurality of STAs have data to be transmitted, STA3 may immediately transmit a data frame because the medium is idle during a DIFS, whereas the other STAs wait until the medium is idle. Since the medium has been busy for some time, a plurality of STAs may wait for an opportunity to use the medium. Therefore, each STA selects a random backoff count. Herein, STA2 selects a smallest backoff count and thus transmits a data frame in FIG. 3.

After STA2 completes the transmission, the medium gets idle. Then the STAs resume the count-down of the remaining backoff intervals. In FIG. 3, STA5, which has a second-smallest random backoff count and discontinued its count-down while the medium is busy, counts down the residual backoff slots and starts to transmit a data frame. However, the residual backoff time of STA5 happens to be equal to that of STA4. As a result, collision occurs between STA4 and STA5. Since, either STA4 or STA5 does not receive an ACK after the data transmission, STA4 and STA5 double CW values and select random backoff counts again.

As described before, the basics of CSMA/CA is carrier sensing. An STA uses physical carrier sensing and virtual carrier sensing to determine whether a DCF medium is busy or idle. A Physical layer (PHY) performs physical carrier sensing by energy detection or preamble detection. For example, if the PHY determines that a receiver has measured a voltage level or has read a preamble, it may determine that the medium is busy. In virtual carrier sensing, data transmission of other STAs is prevented by setting a Network Allocation Vector (NAV). This is done by means of a value of a Duration field in a MAC header. Meanwhile, a robust collision detection mechanism has been introduced to reduce the probability of collision. The reason for introducing the robust collision detection mechanism will be described with reference to the following two examples. For the convenience of description, it is assumed that a carrier sensing range is identical to a transmission range.

Figure 4:
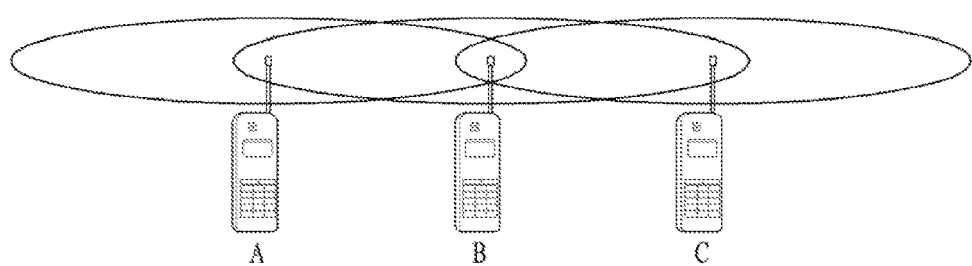
FIGS. 4 and 5 are exemplary diagrams describing problems encountered with a conventional collision resolution mechanism.
Figure 5:
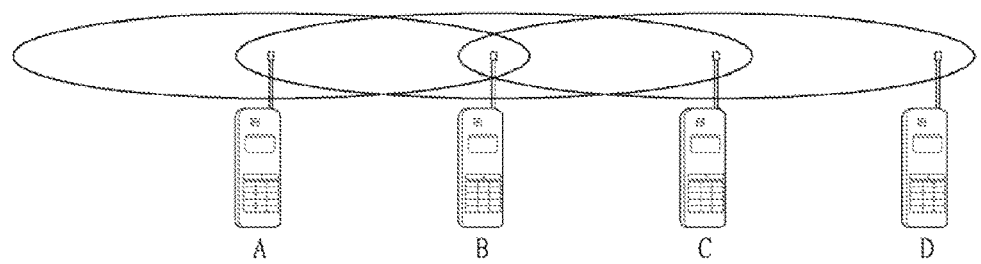

FIGS. 4 and 5 are exemplary diagrams describing problems encountered with a conventional collision resolution mechanism.

Specifically, FIG. 4 is a diagram describing a hidden node issue. In FIG. 4, STA A is communicating with STA B, and STA C has information to be transmitted. Specifically, STA C is likely to determine that a medium is idle during carrier sensing before transmitting data to STA B, although STA A is transmitting information to STA B. Collision occurs because STA B receives information from STA A and STA C simultaneously. Herein, it may be said that STA A is a hidden node to STA C.

FIG. 5 is a diagram describing an exposed node issue. In FIG. 5, STA B is transmitting data to STA A. STA C performs carrier sensing and determines that a medium is busy due to transmission of STA B. Therefore, although STA C has information to be transmitted to STA D, STA C should wait unnecessarily until the medium is idle since the medium is sensed as busy. That is, even though STA A is actually located out of the transmission range of STA C, STA C does not transmit information. Herein, STA C is an exposed node to STA B.

To efficiently utilize a collision avoidance mechanism in the above situation, short signaling packets such as Request To Send (RTS) and Clear To Send (CTS) frames may be introduced, so that neighboring STAs may determine by overhearing whether information is transmitted between two STAs. That is, if a transmitting STA transmits an RTS frame to a receiving STA, the receiving STA may indicate to its neighboring STAs that it will receive data by transmitting a CTS frame to the neighboring STAs.

Figure 6:
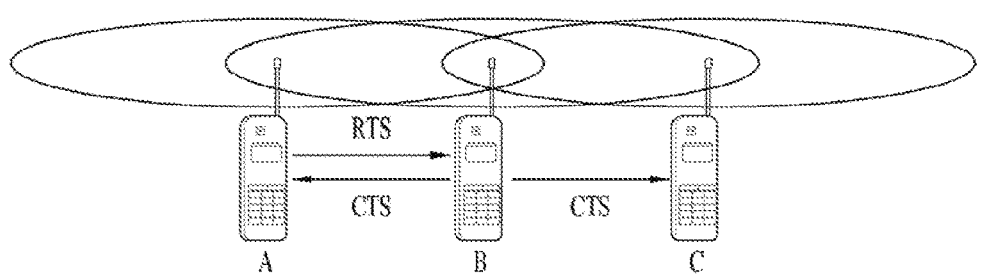
FIG. 6 is a diagram illustrating a mechanism of solving a hidden node issue using a Ready To Send (RTS)/Clear To Send (CTS) frame.

FIG. 6 illustrates a mechanism of solving the hidden node issue.

In FIG. 6, both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

Figure 7:
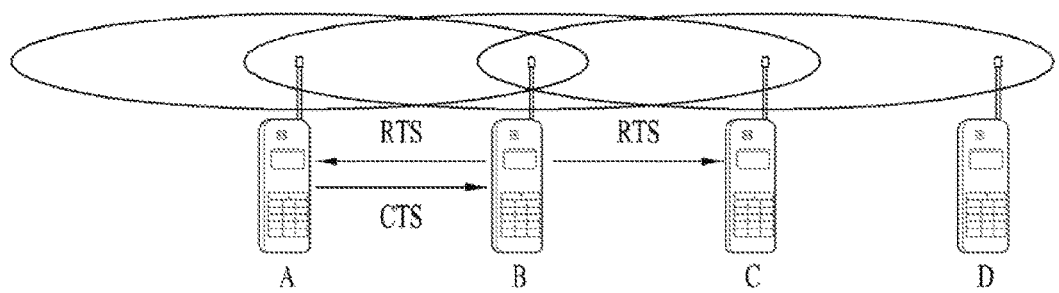
FIG. 7 is a diagram illustrating a mechanism of solving an exposed node issue using an RTS/CTS frame.

FIG. 7 illustrates a mechanism of solving the exposed node issue using an RTS/CTS frame.

It is noted from FIG. 7 that since STA C overhears RTSC/CTS transmission between STA A and STA B, transmission of STA C to STA D does not cause collision. That is, STA B transmits an RTS frame to all neighboring STAs, and only STA A having actual transmission data transmits a CTS frame. Since STA C receives only the RTS frame without receiving the CTS frame, STA C may be aware that STA A is outside the CS range of STA C.

Figure 8:
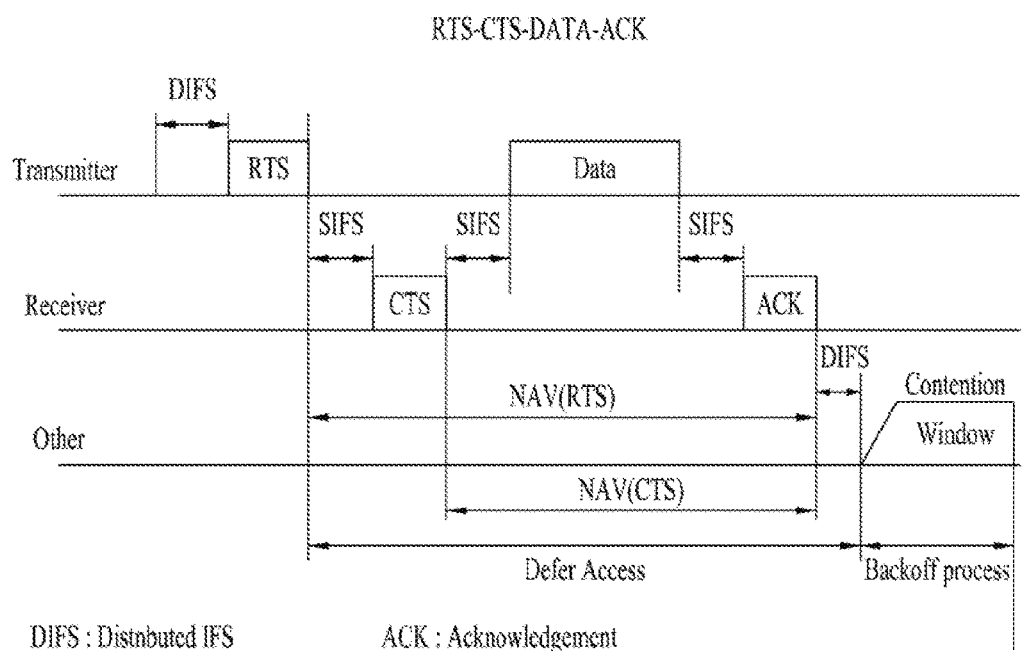
FIG. 8 is a diagram illustrating a specific operation method using an RTS/CTS frame.

FIG. 8 is a diagram illustrating a method for operating using the above-described RTS/CTS frame.

In FIG. 8, a transmitting STA may transmit an RTS frame to a receiving STA after a DIFS. Upon receipt of the RTS frame, the receiving STA may transmit a CTS frame to the transmitting STA after a Short IFS (SIFS). Upon receipt of the CTS frame from the receiving STA, the transmitting STA may transmit data after an SIFS, as illustrated in FIG. 8. Upon receipt of the data, the receiving STA may transmit an ACKnowledgement (ACK) in response to the received data.

Meanwhile, an STA, which has received the RTS/CTS frame of the transmitting STA among neighbor STAs, may determine whether a medium is busy according to reception or non-reception of the RTS/CTS frame, as described before with reference to FIGS. 6 and 7, and may set a Network Allocation Vector (NAV) accordingly. Upon expiration of a time period indicated by the NAC, the collision resolution operation described with reference to FIG. 3 may be performed after a DIFS.

In the legacy WLAN system, a frame is transmitted in a contention-based manner according to a predetermined criterion (e.g., DCF, Enhanced Distributed Channel Access (EDCA), and the like) irrespective of an AP or a non-AP STA. For example, in a state where 100 non-AP STAs are associated with a single AP, every STA transmits a frame equally by contention irrespective of an AP or a non-AP STA. In an actual WLAN environment, the amount of data that an AP transmits to all STAs is larger than or approximate to the amount of data that every STA transmits to the AP. Accordingly, if the AP has data to be transmitted to a number of STAs and many STAs have transmission data, contention may be heated or many collisions may occur. As a consequence, as the AP transmits data to the last STA with a time delay, a user's Quality of Service (QoS) may not be satisfied, or a packet transmission timeout may occur, thus causing discarding of a packet. This situation may be fatal to real-time service such as audio/video streaming.

Moreover, a large amount of data transmitted by the AP may delay transmissions of STAs and thus increase the number of STAs attempting frame transmission. In this case, UL transmissions are suddenly concentrated after a DL transmission, resulting in lots of collisions from hidden nodes as described before.

In this high-density WLAN environment, the present invention proposes that an AP operates a DL oriented channel to reduce DL-UL collision.

Figure 9:
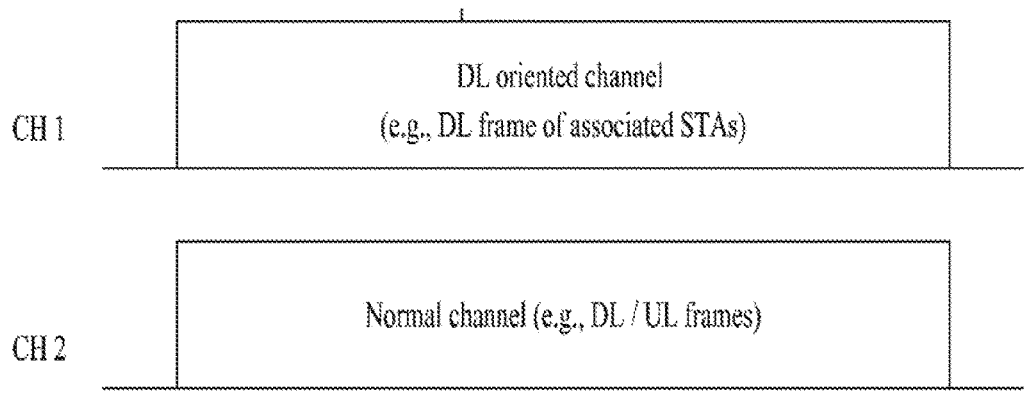
FIG. 9 is a diagram describing the concept of a downlink oriented channel in a WLAN system according to an embodiment of the present invention.

FIG. 9 is a diagram describing the concept of a DL oriented channel in a WLAN system according to an embodiment of the present invention.

As illustrated in FIG. 9, the embodiment of the present invention proposes that when one or more channels are available to an AP, the AP configures one or more channels as DL oriented channels for transmitting data to STAs associated with the AP. In FIG. 9, CH 1 represents a DL oriented channel according to the embodiment, and CH 2 represents a normal channel.

The AP should have normal channels for association of STAs or for supporting legacy STAs. That is, it is assumed that an STA is associated with the AP and transmits and receives data on CH 2 in the same manner as in the legacy WLAN system.

Meanwhile, it is proposed that the AP transmits data to STAs associated with the AP on the DL oriented channel, CH 1 introduced according to the embodiment, without the afore-described contention with UL data transmissions, and receives UL data on the normal channel CH 2. The DL oriented channel is different from the normal channel in that UL data transmission is not performed on the DL oriented channel. However, a control signal (e.g., ACK/Negative ACK (ACK/NACK) of an STA related to data transmission of the AP may be transmitted on the DL oriented channel.

A description will be given below of an operation of an active-mode STA using the above-described DL oriented channel.

Figure 10:
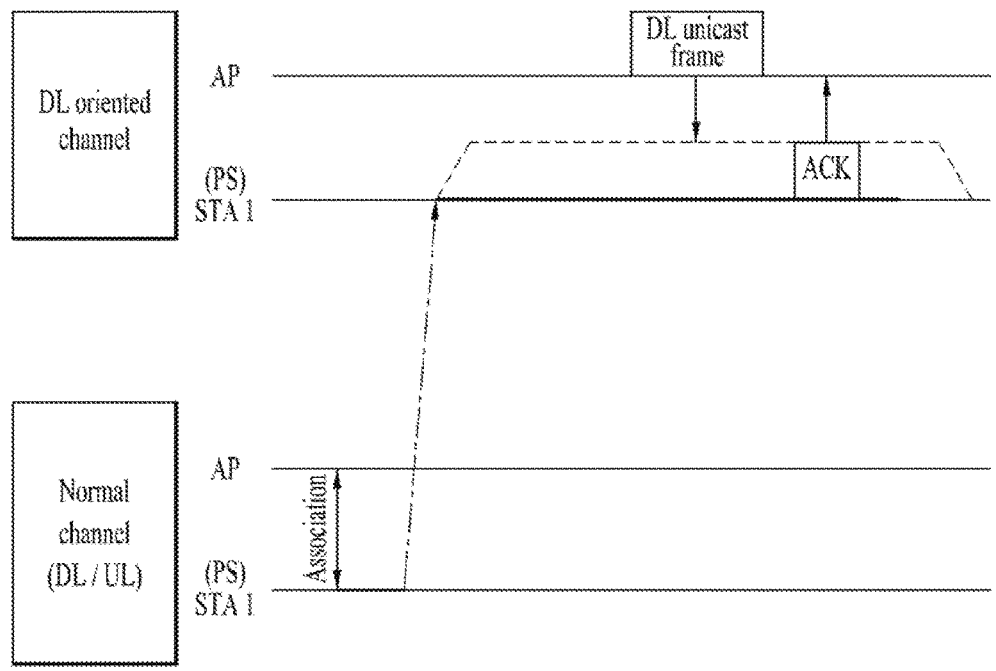
FIG. 10 is a diagram illustrating a method of operating using a downlink oriented channel by an active-mode Station (STA) according to an embodiment of the present invention.

FIG. 10 is a diagram illustrating a method of operating using a DL oriented channel by an active-mode STA according to an embodiment of the present invention.

According to the embodiment, STA 1 may be associated with an AP conventionally. STA 1 may use a normal channel during the association. Meanwhile, if STA 1 associated with the AP operates in active mode, the AP may generally perform the afore-described CCA by switching to a DL oriented channel according to the embodiment. If it turns out from the CCA result that the AP is allowed to transmit data to STA 1, the AP transmits data to STA 1 on the DL oriented channel. Thus, STA 1 may transmit an ACK on the DL oriented channel to the AP.

When an AP transmits a DL frame to an STA that uses a WLAN communication scheme according to the standard to which the present invention will be applied (hereinafter the STA is referred to as 'HEW STA') through a DL oriented channel, the AP may use a DCF (Distributed Coordination Function) method or an EDCA (Enhanced Distributed Channel Access) method. The DCF or EDCA defined for channel access means a function for enabling a plurality of STAs within a single BSS to efficiently use channels when the plurality of the STAs use the channels competitively. However, in the case of the DL oriented channel, since only the AP in the single BSS uses the DL oriented channel, the pre-defined DCF/EDCA schemes may not be efficient. To overcome this problem, a method for an AP to transmit data to an STA through a DL oriented channel is provided in an aspect of the present invention.

In the conventional system, if an STA hears CTS from a different STA and then transmits a frame, the different STA that transmits the CTS may fail to receive a frame. Thus, when a certain STA (including an AP) hears CTS, the STA configures a NAV during a duration contained in the CTS and does not use a channel (i.e., does not attempt to transmit a frame). In this case, there may be a lot of cases where resources are not used appropriately. Thus, to overcome the above-mentioned problem, a method for enabling data transmission through power control by selecting an appropriate STA even when a NAV is configured is provided in another aspect of the present invention.

First Aspect—Schemes Depending on Whether an STA is Located within an OBSS

As a method for an AP to transmit data to an STA through a DL oriented channel in a resource efficient manner, a method of determining a data transmission channel by selectively applying DCF/EDCA schemes according to whether the STA is located within an OBSS (overlapping BSS) is explained in the following description. In addition, a method of improving WLAN efficiency through the above method is also proposed.

To obtain and maintain OBSS information of an STA, an AP can directly obtain the OBSS information or indirectly obtain the OBSS information from STAs associated with the AP.

In case that the AP directly obtains the OBSS information, if receiving Beacon/Probe Response transmitted by another AP, the AP can determine that an OBSS is located adjacent to the corresponding AP and then configure the OBSS information based on the obtained information.

The indirect OBSS detection may depend on the conventional STA's reporting. While the STA performs association with the AP, the STA maintains the OBSS information based on the information (Beacon/Probe Response) obtained by scanning. Thereafter, the STA can inform the AP of its OBSS information by including the OBSS information (e.g., BSSID, beacon interval, DL oriented channel information) in an association frame or a frame transmitted after the association procedure.

In addition, even after the association, the STA can inform the AP of the OBSS information periodically or aperiodically (i.e., event-based manner). For example, when new OBSS information is received or when the STA's OBSS information is updated due to change in the existing OBSS information, the STA informs the AP of the new OBSS information or the updated OBSS information.

The AP can request a non-AP STA to send OBSS information of the corresponding STA. In addition, after receiving the request for the OBSS information, the non-AP STA can inform the AP of its OBSS information based on the OBSS information stored in the non-AP STA.

The AP configures an OBSS state of the corresponding AP or OBSS states of STAs belonging to the corresponding AP based on the information obtained through the direct or indirect method.

When the AP transmits DL frames to HEW STAs through DL oriented channels after configuring the OBSS information, the AP may use one of the following methods.

(1) A Case in which there is No STA Located in the OBSS

In this case, since a channel is always in an idle state, the AP can transmit the DL frame based on PIFS/DIFS. In other words, if the channel is idle during the PIFS or DIFS, the AP can transmit the DL frame to a corresponding STA without performing DCF/EDCA procedures.

Figure 11:
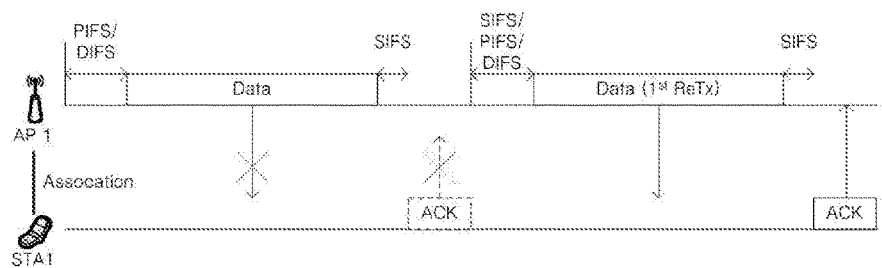
FIG. 11 is a diagram for explaining a method for an AP to transmit data when there is no OBSS STA according to one embodiment of the present invention.

FIG. 11 is a diagram illustrating a method for an AP to transmit data when there is no OBSS STA according to one embodiment of the present invention.

Once the PIFS or DIFS is determined by the system, which one of the PIFS and DIFS is used can be informed to STAs associated with the AP. After transmitting the DL frame to a certain STA through the DL oriented channel, the AP receives ACK from the corresponding STA. Thereafter, when the AP intends to transmit the DL frame to a different STA, the AP can transmit the DL frame to the corresponding different STA if the channel is idle during the PFIS/DIFS.

Meanwhile, If the AP fails to receive ACK during a prescribed time (i.e., before an ACK timer expires) after transmitting the DL frame to an STA through the DL oriented channel, the AP can retransmit the DL frame to the corresponding STA. In this case, unlike to the conventional method (e.g., after performing exponential backoff on a contention window, the AP performs the retransmission if the channel is idle during the corresponding duration), if the channel is idle during one of SFIS/PIFS/DIFS as shown in FIG. 11, the AP may be configured to attempt the DL frame transmission.

Figure 12:
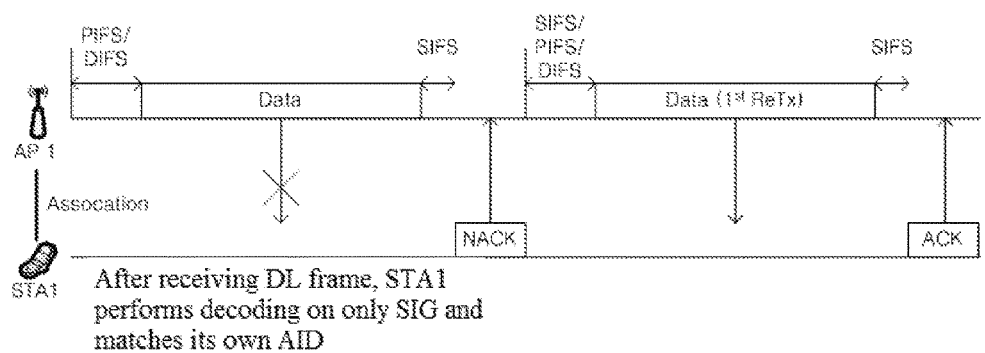
FIG. 12 is a diagram for explaining a method for an AP to transmit data when there is no OBSS STA according to another embodiment of the present invention.

FIG. 12 is a diagram illustrating a method for an AP to transmit data when there is no OBSS STA according to another embodiment of the present invention.

The embodiment illustrated in FIG. 12 shows a NACK-based retransmission scheme. Assuming that AID is included in SIG, if an STA succeeds in decoding the SIG on a preamble and fails in decoding MPDU as shown in FIG. 12, the STA can receive a frame containing AID that matches AID of the corresponding STA. Thereafter, the STA can transmit NACK after SIFS.

When an AP receives the NACK after transmitting the DL frame to the STA through a DL oriented channel, the AP determines that the STA fails to receive the DL frame correctly. After SIFS/PIFS/DIFS, the AP can retransmit the DL frame.

Specifically, referring to FIG. 12, when AP1 transmits a DL frame to STA1, the STA1 checks its own AID on received SIG of PPDU. When the STA1 fails in decoding MPDU, the STA1 transmits NACK after SIFS. Since the AP1 receives the NACK from the STA1 after transmitting a data frame to the STA1, the AP1 can retransmit the data frame after SIFS (PIFS or DIFS).

Figure 13:
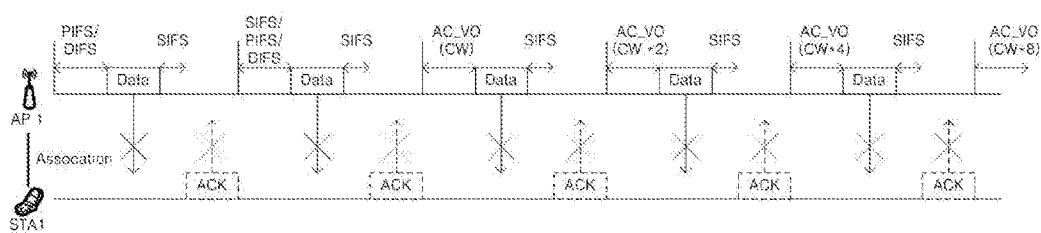
FIGS. 13 and 14 are diagrams for explaining a scheme of increasing a waiting time for retransmission in a stepwise manner according to another embodiment of the present invention.

FIG. 13 is a diagram for explaining a scheme of increasing a waiting time for retransmission in a stepwise manner according to another embodiment of the present invention.

When an AP fails to receive ACK after SIFS after transmitting a frame to an STA, the AP may retransmit the frame. In this embodiment, it is proposed that the AP performs the retransmission using a stepwise method.

Here, the stepwise retransmission method means that AP's waiting time for the retransmission is increased in a stepwise manner. For instance, PIFS/DIFS is used in first retransmission, AC_VO is used in second transmission, and thereafter, retransmission may be performed in a manner of doubling CW until when the CW reaches to the CWmax value.

Figure 14:
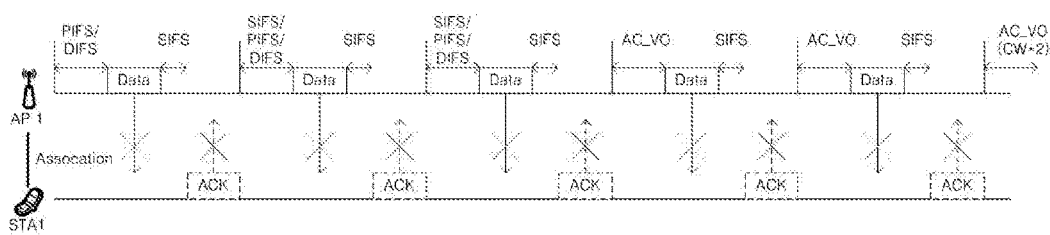

The stepwise retransmission can be modified as follows. In the case of the first/second retransmission, the AP retransmits frames immediately after the PIFS/DIFS. In the case of next two times (third and fourth) of retransmission, the AP retransmits frames using the AC_VO. Thereafter, the retransmission may be performed in a manner of doubling (i.e., exponential backoff) the contention window similar to the existing retransmission. FIG. 14 shows an example of the modified stepwise retransmission method.

In case of a chase combining scheme, (partial) AID and a (partial) sequence number may be included in the SIG of the DL frame and then transmitted. Thus, when the STA succeeds in decoding only the SIG and fails in decoding the MPDU, the STA can obtain combining gain by checking the (partial) AID and sequence number of the SIG.

Meanwhile, when an AP according to an embodiment of the present invention fails to receive ACK within a prescribed time after transmitting a DL frame to a certain STA through a DL oriented channel, the frequency of the occurrence of retransmission may exceed the maximum number of times of retransmission. In this case, the AP can transmit the DL frame for the corresponding STA through a normal channel instead of the DL oriented channel. In addition, the AP may inform STAs of the relevant information (e.g., Switch indication to normal channel, STAs' ID information, etc.) through beacon frames.

When the STAs, which has received the DL frames through the DL oriented channels, receives, through beacons, the information indicating that their DL frames will be transmitted through the normal channels, the corresponding STAs can perform operations for receiving the DL frames on the normal channels. Moreover, the STAs can include information (e.g., STA AID, Switch indication to normal channel, etc.) indicating that they will receive the DL frames through the normal channels in UL frames (i.e., existing frame (e.g., PS-Poll) or new frame) in order to inform the AP of the information. After receiving the UL frames from the STAs, the AP can transmit the DL frames to the corresponding STAs through the normal channels using the conventional channel access method (e.g., DCF, EDCA, etc.).

Further, the above-described retransmission scheme and error recovery scheme can also be applied to the following schemes in the same manner.

When one or more STAs among the STAs associated with the AP are located in the OBSS, the AP may operate as follows.

When the AP fails to directly detect a different AP, i.e., detects the different AP using the indirect method, the AP may transmit the DL frame using one of the following methods.

First, when the AP receives OBSS information from an STA, the AP can perform transmission based on the EDCA on the normal channel for STAs belonging to the OBSS and transmission based on the PIFS/DIFS or AC_VO on the DL oriented channel for STAs not belonging to the OBSS. This method may be more useful when the number of the STAs not belonging to the OBSS is greater than that of the STAs belonging to the OBSS.

As another method, the AP can transmit the frames based on the EDCA not to affect the OBSS STAs. This method may be more useful when the number of the STAs not belonging to the OBSS is smaller than that of the STAs belonging to the OBSS.

On the other hand, When the AP directly detects a different AP, the AP transmits the DL frame based on the EDCA.

Second Aspect—Data Transmission after NAV Configuration

As described above, an STA (AP) that receives CTS does not use a channel after configuring NAV. In the following description, a method of increasing efficiency in the use of resources by using TPC (Transmit Power Control) on a DL oriented channel is proposed. In this case, an AP is assumed to operate based on the EDCA.

When the AP receives CTS transmitted from a different STA while operating the DL oriented channel, the AP can configure the NAV and then check that there are packets to be transmitted to STAs associated with the corresponding AP. According to an embodiment of the present invention, when the AP has the packet to be transmitted, the AP can transmit the packet to the associated STA by reducing power so as not to affect the STA that transmits the CTS.

Figure 15:
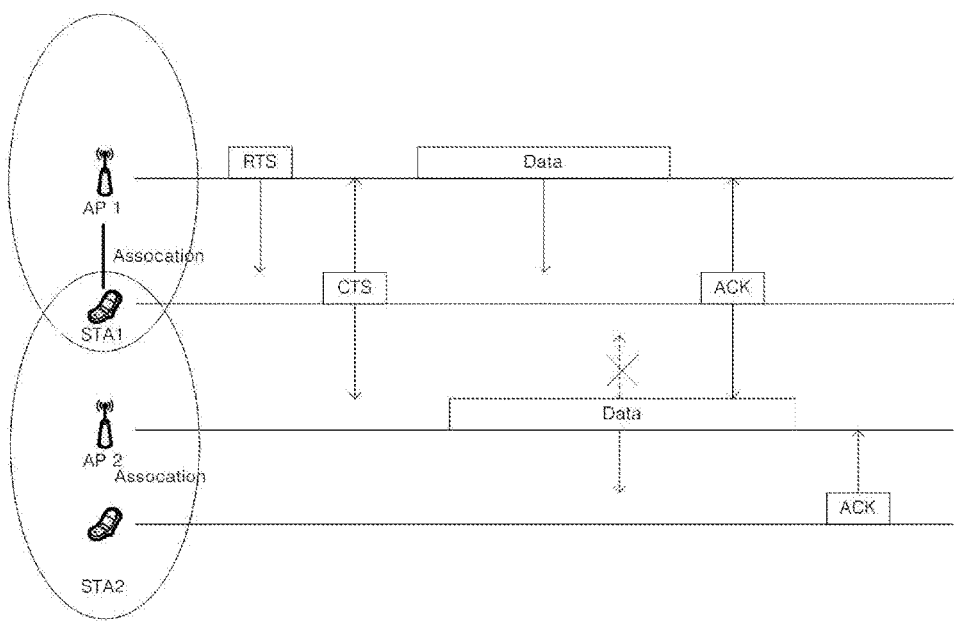
FIG. 15 is a diagram for explaining a method for an AP to transmit data after configuring a NAV according to an embodiment of the present invention.

FIG. 15 is a diagram for explaining a method for an AP to transmit data after configuring a NAV according to an embodiment of the present invention Referring to the example of FIG. 15, since STA1 is associated with AP1 and is also located in a transmission area of AP2, the STA1 may receive a frame transmitted by the AP2. STA2 is associated with the AP2.

As shown in the example of FIG. 15, the AP1 may transmit RTS to the STA1 and the STA1 may transmit CTS to the AP1 in response to the RTS. As shown in the drawing, since the CTS does not contain an address of the AP2, the AP2 may configures a NAV after receiving the CTS. According to the present embodiment, if the AP2 has data to be transmitted to the STA2, the AP2 can transmit the data. In this case, the AP2 reduces power so as not to affect data reception at the STA1 that transmits the CTS and then transmits the data to the STA2. Thus, a data signal transmitted from the AP2 to the STA2 rarely affects the reception at the STA1.

After receiving the data frame from the AP2, the STA2 can transmit ACK in response to the data frame. As shown in FIG. 15, it is proposed that an interval for the data transmitted by the AP2 is set greater than an interval for which the STA1 completes a process for ACK after receiving data from the AP1. For instance, the data frame transmission interval of the AP2 can be calculated according to Formula 1 below.

AP2's data transmission interval>=duration of CTS frame−(expected data transmission start time−time that CTS is received from STA1) [Formula]

Figure 16:
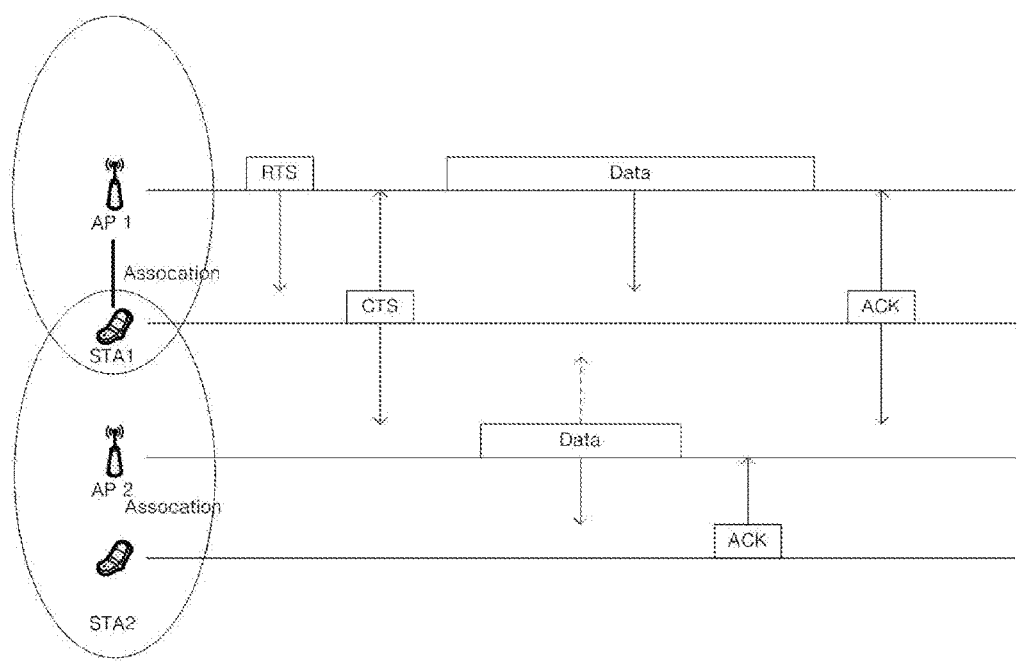
FIG. 16 is a diagram for explaining a method for an AP to transmit data after configuring a NAV according to another embodiment of the present invention.

FIG. 16 is a diagram for explaining a method for an AP to transmit data after configuring a NAV according to another embodiment of the present invention Referring to FIG. 16, since AP2 receives CTS from STA1 and reduces power of data when transmitting the data to STA2, the AP2 does not affect the STA1. In this case, it is proposed that regarding a size of the data, the AP2 sets a time at which a data-ACK (ACK or Block ACK) sequence between the AP2 and STA2 is completed smaller than a time at which the AP1 completes transmission of data to the STA1. For instance, the data frame transmission interval of the AP2 can be calculated according to Formula 2 below.

AP2's data transmission interval=<Duration of CTS frame−STA1's ACK size−STA2's ACK size−2*SIFS−(Expected data transmission start time−time that CTS is received from STA1) [Formula 2]

Therefore, the AP2 can correctly receive ACK for the data from the STA2.

Figure 17:
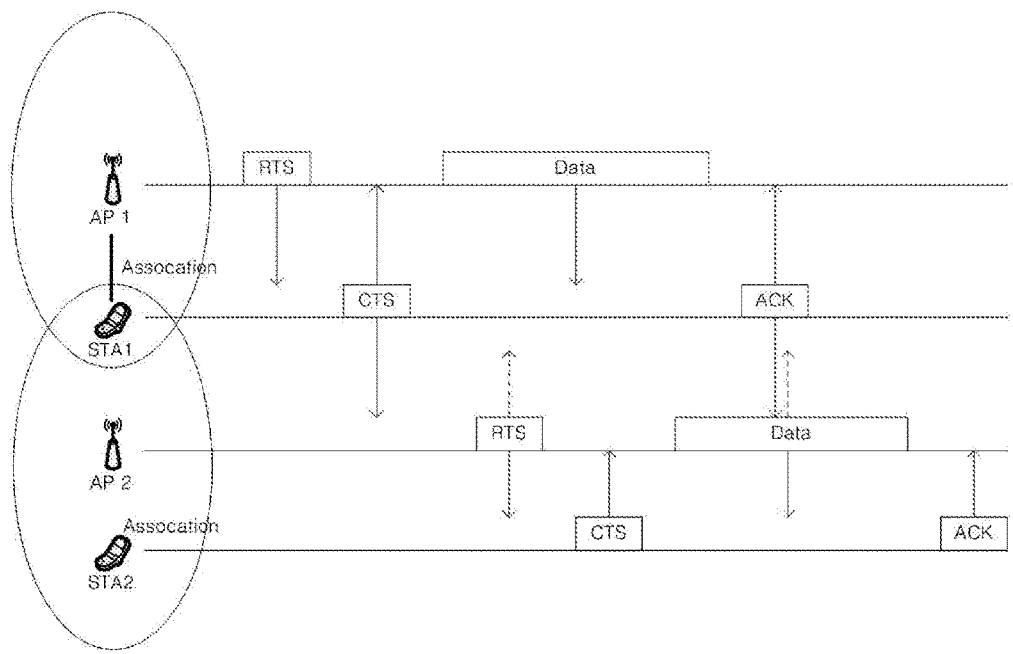
FIG. 17 is a diagram for explaining a method for an AP to transmit data after configuring a NAV according to a further embodiment of the present invention.

FIG. 17 is a diagram for explaining a method for an AP to transmit data after configuring a NAV according to a further embodiment of the present invention.

Referring to FIG. 17, AP2 receives CTS from STA1. In addition, before transmitting data to STA2, the AP2 may transmit RTS to the STA2 in advance. After receiving CTS from the STA2, the AP2 may transmit the data to the STA2. Similar to the above-mentioned examples of FIGS. 15 and 16, for the data transmission, the AP2 may configure a data frame size according to either Formula 1 or Formula 2 above.

In FIG. 16 or FIG. 17, when the AP2 transmits data to the STA associated with the AP2 (i.e., STA2 in the examples) after hearing CTS that does not contain the AP2's address from the STA1, the STA2 or the STA1 may fail to receive the data frame depending on a location of the STA2. Specifically, when the STA2 is located between the AP2 and the STA1 or within a transmission area of the AN, the STA2 or the STA1 may fail to receive the data frame. Thus, when the AP2 transmits the DL frame to one of associated STAs, the AP2 needs to select the STA appropriately.

As an embodiment of the present invention, a method for an AP to transmit data by appropriately selecting a receiving STA before data transmission through at least one of the following methods is proposed.

First, the AP can select STAs located out of an OBSS area as data receiving STAs. Through the above-mentioned indirect OBSS detection, the AP can be aware of which STAs are located out of the OBSS area.

Second, the AP can select STAs capable of satisfying a data transmission interval of the AP on a buffer (or queue) among the STAs located out of the OBSS area as the receiving STAs. For example, the AP may select an STA having the highest quality of MCS from the above STAs and then determine the STA as a final data receiving STA. Moreover, the AP may perform the selection based on MCS of the last transmitted frame.

Figure 18:
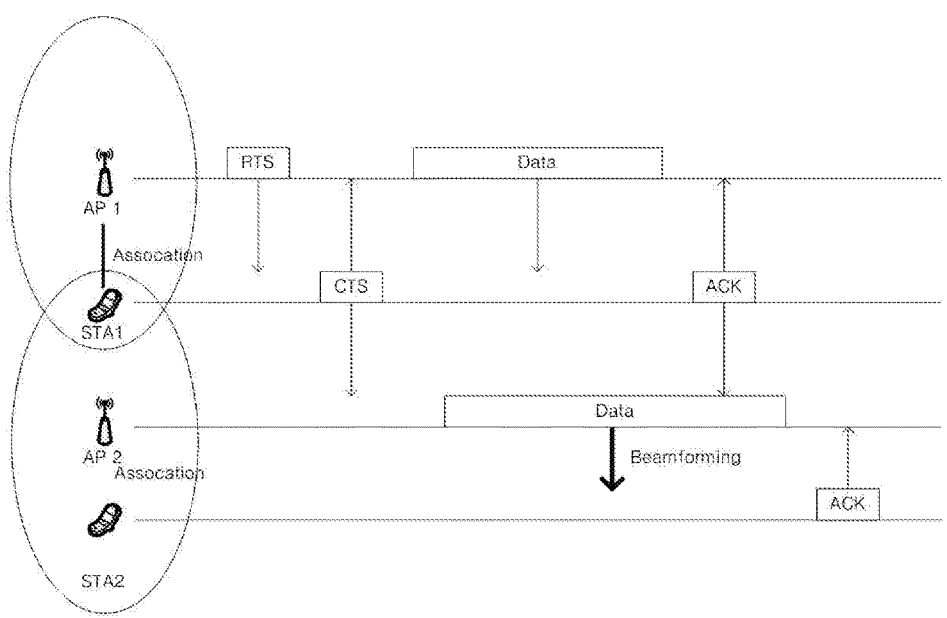
FIG. 18 is a diagram for explaining a method for an AP to transmit data to an STA associated with the AP through beamforming after configuring a NAV according to a further embodiment of the present invention.

FIG. 18 is a diagram for explaining a method for an AP to transmit data to an STA associated with the AP through beamforming after configuring a NAV according to a further embodiment of the present invention.

As shown in FIG. 18, it is additionally proposed that when an AP that receives CTS containing an address of a different STA intends to transmit a data/management frame to an STA using the above-defined TPC method, the AP uses beamforming for the data/management frame transmission. In this case, the AP performs the beamforming using feedback information previously received from the STA. Moreover, when AP2 transmits data to STA2 as shown in the example of FIG. 18, the AP2 may perform the beamforming such that an effect on data reception at STA1 is minimized.

Figure 19:
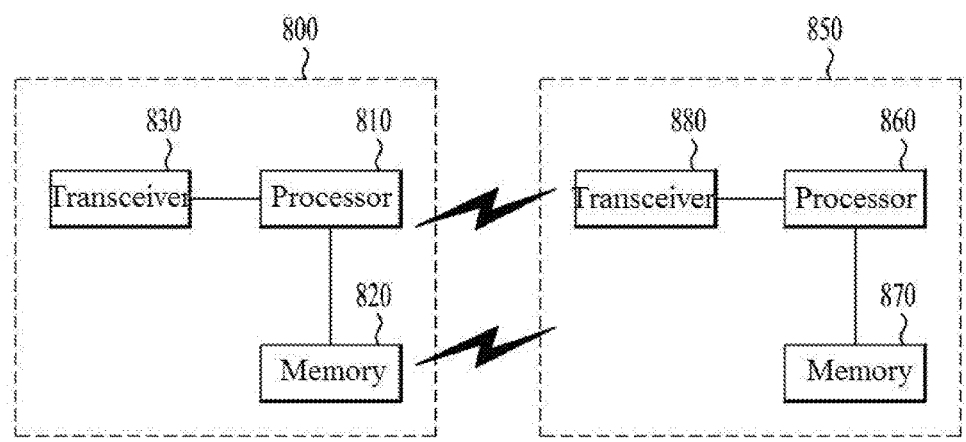
FIG. 19 is a diagram illustrating devices for implementing a WLAN operating method using a downlink oriented channel.

FIG. 19 is a diagram illustrating devices for implementing a WLAN operating method using the aforementioned downlink oriented channel.

In FIG. 19, a wireless device 800 may correspond to the above-described specific STA and a wireless device 850 may correspond to the above-mentioned AP.

The STA may include a processor 810, a memory 820, and a transceiver unit 830 and the AP 850 may include a processor 860, a memory 870, and a transceiver unit 880. The transceiver unit 830/880 may transmit/receive radio signals and be driven by a physical layer in IEEE 802.11/3GPP. The processor 810/860 may be driven by a physical layer and/or an MAC layer and connected to the transceiver unit 830/880. The processor 810/860 can perform the aforementioned interference control procedure.

The processor 810/860 and/or the transceiver unit 830/880 may include an application-specific integrated circuit (ASIC), a different chipset, a logic circuit, and/or a data processor. The memory 820/870 may include a read-only memory (ROM), a random access memory (RAM), a flash memory, a memory card, a storage medium, and another storage unit. When an embodiment is executed by software, the above-described methods may be implemented as modules for performing the aforementioned functions. The modules can be stored in the memory 820/870 and driven by the processor 810/860. In addition, the memory 820/870 can be provided within or outside the processor 810/860 and connected to the processor 810/860 by well-known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the present invention has been described above in the context of an IEEE 802.11 WLAN system, the present invention is not limited to the specific system. Therefore, the present invention is applicable in the same manner to various wireless systems requiring control of interference between wireless devices.

What is claimed is:

1. A method of transmitting data by an AP (access point) in a WLAN (Wireless Local Area Network) system, the method comprising:
   obtaining information related to an STA (Station) located in an OBSS (overlapping basic service set) among STAs associated with the AP;
   determining whether to transmit the data via a downlink oriented channel or a normal channel different from the downlink oriented channel or whether to use at least a DCF (distributed coordination function) procedure and an EDCA (enhanced distributed channel access) procedure, the determination according to whether an STA associated with the AP is located in the OBSS; and
   transmitting the data according to the determination,
   wherein the data is transmitted via the downlink oriented channel without the DCF procedure and the EDCA procedure when no STA is located in the OBSS and when the downlink oriented channel is idle during a PIFS (point coordination function interframe space) duration or a DIFS (distributed coordination function interframe space) duration.

2. The method of claim 1, wherein obtaining the information comprises receiving a beacon or a probe response transmitted by a neighboring AP.

3. The method of claim 1, wherein obtaining the information comprises receiving OBSS information from the STA associated with the AP.

4. The method of claim 1, further comprising determining whether the downlink oriented channel is idle during the PIFS duration or the DIFS duration and retransmitting the data without applying a backoff time when no ACK (ACKnowledgement) is received in response to the data transmitted during a predetermined time.

5. The method of claim 4, further comprising increasing a data retransmission waiting time according to a number of times of the data is retransmitted.

6. The method of claim 1, wherein the data is transmitted to a specific STA via the normal channel after the AP attempts to retransmit the data to the specific STA via the downlink oriented channel at least a predetermined number of times.

7. The method of claim 1, wherein:
   the data is transmitted to the STA located in the OBSS via the normal channel; and
   the data is transmitted to an STA located outside the OBSS among the STAs associated with the AP via the downlink oriented channel.

8. The method of claim 1, wherein the data is transmitted using at least the DCF procedure or the EDCA procedure when a number of STAs located in the OBSS is equal to or greater than a predetermined threshold.

9. The method of claim 1, further comprising:
configuring an NAV (network allocation vector) upon receiving a CTS (clear to send) frame from a first STA; and
transmitting the data to a second STA among the STAs associated with the AP by controlling transmit power such that data reception at the first STA is not affected.

10. The method of claim 9, wherein the data is transmitted to the second STA such that the data transmission is completed after a time at which the first STA completes data reception and transmits an ACK (ACKnowledgement).

11. The method of claim 9, wherein the data is transmitted to the second STA and an ACK (ACKnowledgement) is received before the first STA completes data reception.

12. The method of claim 9, wherein the data is transmitted after exchanging an RTS (ready to send) frame and the CTS frame with the second STA.

13. The method of claim 9, further comprising selecting an STA located outside the OBSS as the second STA.

14. The method of claim 9, further comprising performing beamforming on the second STA when transmitting the data in order to control an effect on data reception at the first STA.

15. An AP (access point) transmitting data in a WLAN (Wireless Local Area Network) system, the AP comprising:
a transceiver for transmitting and receive radio signals; and
a processor for:
controlling the transceiver to obtain information related to an STA (Station) located in an OBSS (overlapping basic service set) among STAs associated with the AP;
determining whether to transmit the data via a downlink oriented channel or a normal channel different from the downlink oriented channel or whether to use at least a DCF (distributed coordination function) procedure and an EDCA (enhanced distributed channel access) procedure, the determination according to whether an STA associated with the AP is located in the OBSS; and
controlling the transceiver to transmit the data according to the determination,
wherein the data is transmitted via the downlink oriented channel without the DCF procedure and the EDCA procedure when no STA is located in the OBSS and when the downlink oriented channel is idle during a PIFS (point coordination function interframe space) duration or a DIFS (distributed coordination function interframe space) duration.

16. The AP of claim 15, wherein the processor is further for:
determining whether the downlink oriented channel is idle during the PIFS duration or the DIFS duration; and
retransmitting the data without applying a backoff time when no ACK (ACKnowledgement) is received in response to the data transmitted during a predetermined time.

17. The AP of claim 15, wherein the data is transmitted to a specific STA via the normal channel after the AP attempts to retransmit the data to the specific STA via the downlink oriented channel at least a predetermined number of times.

18. The AP of claim 15, wherein:
the data is transmitted to the STA located in the OBSS via the normal channel; and
the data is transmitted to an STA located outside the OBSS among the STAs associated with the AP via the downlink oriented channel.

19. The AP of claim 15, wherein the data is transmitted using at least the DCF procedure or the EDCA procedure when a number of STAs located in the OBSS is equal to or greater than a predetermined threshold.

20. The AP of claim 15, wherein the processor is further for:
configuring an NAV (network allocation vector) upon receiving a CTS (clear to send) frame from a first STA; and
controlling the transceiver to transmit the data to a second STA among the STAs associated with the AP by controlling transmit power such that data reception at the first STA is not affected.

* * * * *